(12) United States Patent
Park et al.

(10) Patent No.: US 10,382,546 B2
(45) Date of Patent: Aug. 13, 2019

(54) POWER SYSTEM AND METHOD FOR TRANSFERRING DATA USING THE SAME

(71) Applicant: LSIS CO., LTD., Gyeonggi-do (KR)

(72) Inventors: Jong-Ho Park, Gyeonggi-do (KR); Yong-Ik Lee, Gyeonggi-do (KR); Sung-Ho Kim, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 200 days.

(21) Appl. No.: 15/250,480

(22) Filed: Aug. 29, 2016

(65) Prior Publication Data

US 2017/0070568 A1    Mar. 9, 2017

(30) Foreign Application Priority Data

Sep. 3, 2015    (KR) .......................... 10-2015-0125171

(51) Int. Cl.
*G06F 15/16*    (2006.01)
*H04L 29/08*    (2006.01)
*G06Q 10/06*    (2012.01)
*G06Q 50/06*    (2012.01)

(52) U.S. Cl.
CPC ......... *H04L 67/1095* (2013.01); *G06Q 10/06* (2013.01); *G06Q 50/06* (2013.01); *H04L 67/06* (2013.01)

(58) Field of Classification Search
CPC ..... H04L 67/1095; H04L 67/06; G06Q 10/06; G06Q 50/06
USPC ....................................................... 709/201
See application file for complete search history.

(56) References Cited

U.S. PATENT DOCUMENTS

| | | | |
|---|---|---|---|
| 6,694,350 B2* | 2/2004 | Kurashima | H04L 12/1859 370/218 |
| 8,554,147 B2 | 10/2013 | Bhattad et al. | |
| 9,083,474 B2 | 7/2015 | Krishnaswamy et al. | |
| 9,111,240 B2 | 8/2015 | Petite | |
| 2012/0179301 A1 | 7/2012 | Aivaliotis et al. | |
| 2013/0061291 A1* | 3/2013 | Hegg | G06F 21/33 726/4 |

(Continued)

FOREIGN PATENT DOCUMENTS

| | | |
|---|---|---|
| CN | 101193094 A | 6/2008 |
| CN | 103973785 A | 8/2014 |

(Continued)

OTHER PUBLICATIONS

European Search Report dated Dec. 13, 2016 corresponding to application No. 16183236.5-1958.
SCADA Energy Management System; GE Energy; 2006.

*Primary Examiner* — Wing F Chan
*Assistant Examiner* — Joseph R Maniwang
(74) *Attorney, Agent, or Firm* — K&L Gates LLP (57) ABSTRACT

In some embodiments, a method for transferring data in a power system includes an energy management system assigning a different service number to each of types of data, transferring a service number corresponding to specific data from a server to the energy management system, transferring the data corresponding to the transferred service number from the energy management system in a broadcast manner, and the server receiving the data transferred from the energy management system in the broadcast manner.

6 Claims, 11 Drawing Sheets

(56) References Cited

U.S. PATENT DOCUMENTS

| | | | | |
|---|---|---|---|---|
| 2013/0083717 A1* | 4/2013 | Vos | ............... | H04W 4/06 |
| | | | | 370/312 |
| 2013/0204452 A1* | 8/2013 | Yamaguchi | ............ | H04B 3/54 |
| | | | | 700/292 |
| 2013/0274936 A1 | 10/2013 | Donahue et al. | | |

FOREIGN PATENT DOCUMENTS

| JP | 4920157 B2 | 4/2012 |
|---|---|---|
| KR | 20060039284 A | 5/2006 |
| KR | 20090072052 A | 7/2009 |

\* cited by examiner

FIG. 1

PRIOR ART

POWER SYSTEM AND METHOD FOR TRANSFERRING DATA USING THE SAME

CROSS REFERENCE TO RELATED APPLICATIONS

This application claims the benefit of Korean Patent Application No. 10-2015-0125171, filed on Sep. 3, 2015, entitled "POWER SYSTEM AND METHOD FOR TRANSFERRING DATA USING THE SAME", which is hereby incorporated by reference in its entirety.

BACKGROUND

Technical Field

Embodiments described herein relate to an energy management system, and more particularly, to a method for transferring data between an energy management system and multiple servers.

Description of the Related Art

With development of computer and communication technologies, the power system is now operated in the form of an energy management system (EMS)/supervisory control and data acquisition (SCADA), which is a distributed system. Thereby, production, transfer and distribution of power are effectively implemented.

However, as the language, operating system and communication protocol for the systems differ from one system to another, the systems suffer difficulties in exchanging data therebetween.

To address this problem, the US Electric Power Research Institute has announced a new communication protocol called Inter-Control Center Protocol (ICCP) to manage communications between power control centers. The ICCP has designated Manufacturing Message Specification (MMS), which is a standard communication protocol for automation, as a sub-protocol of the application layer to support smooth communication between different kinds of control centers.

Meanwhile, a next-generation EMS transfers ICCP data determined according to an agreed protocol to other servers.

Herein, the transferred ICCP data may be broadly divided into analog data and digital data. The analog data may include power generation amount data (of a generator level, substation level, area level, and the like), result data about computation of EMS-SCADA programs, EMS-power application result data, and logic status data (including a manual value, flag setting, tag setting, prohibition of scan, and the like) of a point changed by the EMS. The digital data may include physical status data (On/Off) about apparatuses and system status data (Active/Backup of the servers of the EMS).

The data transferred from the EMS may be received by one or more servers. The servers obtain and process necessary data through operative connection therebetween.

Figure 1:
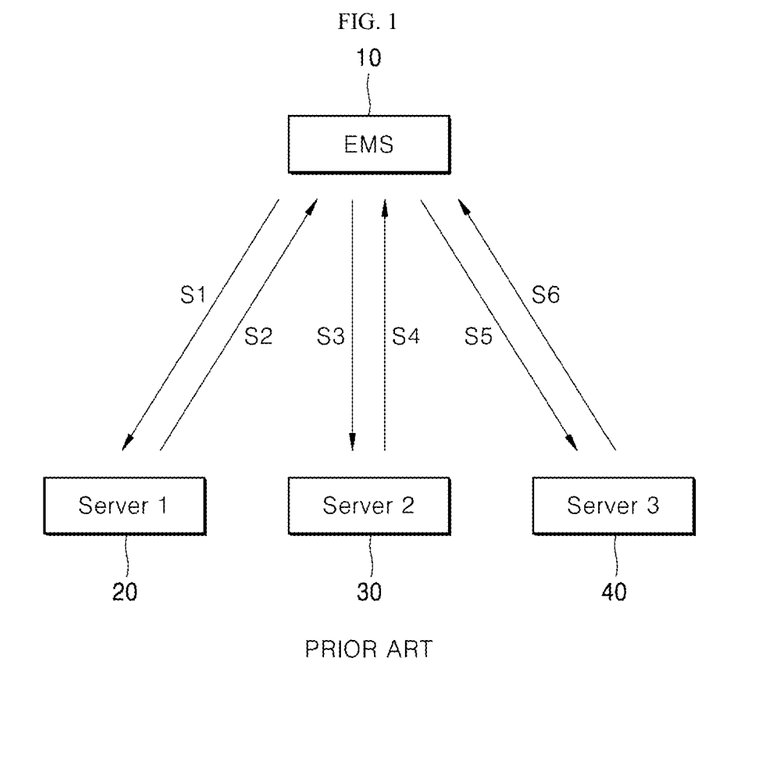
FIG. 1 is a block diagram illustrating a power system according to the prior art.

FIG. 1 is a block diagram illustrating a power system according to the prior art.

Referring to FIG. 1, the power system includes an EMS 10, server 1 20, server 2 30 and server 3 40.

Hereinafter, a description will be given of a data transfer procedure for the power system configured as above.

First, the EMS 10 is connected to server 1 20 in a one-to-one relationship. Thereby, the EMS 10 transfers data needed by server 1 20 to server 1 20 (step 1).

Subsequently, once transfer of the data to server 1 20 is completed, the EMS 10 receives reception result information (an acknowledgement (ACK) signal) from server 1 20 in response to transfer of the data (step 2). That is, the EMS 10 is connected with multiple servers in the one-to-one relationship, and thus transmits data to each connected server. Once transfer of data is completed with the EMS 10 connected with server 1 20 as described above, the EMS 10 needs to terminate connection to server 1 20 to establish connection to the next server for communication and transfer data. However, if server 1 20 fails to normally receive the data transferred by the EMS 10, the EMS 10 needs to perform the procedure of connection and transfer of data to server 1 20 again.

Accordingly, the EMS 10 receives reception result information indicating whether server 1 20 has normally received data.

Upon normally receiving the reception result information, the EMS 10 releases connection to server 1 20, and establishes one-to-one connection to server 2 30. Then, the EMS 10 transfers data to server 2 30 connected thereto (step 3).

Subsequently, once transfer of the data to server 2 30 is completed, the EMS 10 receives, from server 2 30, reception result information (an ACK signal) according to transfer of the data (step 4).

Then, upon normally receiving the reception result information, the EMS 10 releases connection to server 2 30, and establishes one-to-one connection to server 3 40. Then, the EMS 10 transfers data to server 3 40 connected thereto (step 5).

Subsequently, once transfer of the data to server 3 40 is completed, the EMS 10 receives, from server 3 40, reception result information (an ACK signal) according to transfer of the data (step 6).

Upon normally receiving the reception result information from server 3 40, the EMS 10 terminates the data transfer operation.

As described above, the EMS 10 transfers data to a server configured to receive the data by establishing one-to-one connection with the server. In the data transfer procedure, three steps of connecting to a server, transferring data and receiving reception result information needed to be performed to transfer the data to the server.

Accordingly, in order for the EMS 10 to transfer data to multiple servers, the aforementioned three steps need to be repeated by the number of the servers, and a corresponding code needs to be created.

Since the conventional EMS 10 needs to continue to perform the three steps to transfer data to multiple servers, time taken to transfer data may increase according to the number of the servers.

In addition, to switch from a server designated to receive data to another server, a created code needs to be modified. Thereby, recompiling is needed. To proceed with the process after the compiling, the process needs to be suspended for a certain time.

In addition, according to the conventional technology described above, it is not easy to add a server to receive data or remove a server.

SUMMARY

In some embodiments, provided is a method for transferring data from an energy management system capable of transferring data in a broadcast manner.

In some embodiments, provided is a method for transferring data from an energy management system capable of transferring data to multiple servers simultaneously.

In some embodiments, provided is a method for transferring data from an energy management system capable of transferring, to a server, only data needed by the server among multiple data.

In some embodiments, provided is a method for transferring data from an energy management system capable of transferring data to a server configured to receive the data even if one-to-one connection with the server is not established.

Objects of the disclosed embodiments are not limited to the aforementioned objects, and other objects which are not mentioned above will become apparent to those having ordinary skill in the art upon examination of the following description.

In accordance with one embodiment, a method for transferring data in a power system includes an energy management system assigning a different service number to each of types of data, transferring a service number corresponding to specific data from a server to the energy management system, transferring the data corresponding to the transferred service number from the energy management system in a broadcast manner, and the server receiving the data transferred from the energy management system in the broadcast manner.

The data includes at least two of: power generation amount data comprising at least one of a generator level, a substation level and an area level; result data about computation of EMS-SCADA programs; EMS-power application result data; logic status data of a point changed by the energy management system, the logic status data comprising at least one of a manual value, flag setting, tag setting and prohibition of scan; physical status data about apparatuses; and system status data.

The designating of the service number includes the energy management system assigning a different service number to each of the types of data, and assigning one service group number to a plurality of data assigned the service number.

The transferring of the data corresponding to the transferred service number includes adding a service number of the data to the data and transferring the data.

The receiving of the data includes the server checking the service number of the transferred data, determining whether the checked service number is a service number requested by the server, receiving, when the checked service number is the service number requested by the server, the data transferred from the energy management system, and not receiving, when the checked service number is not the service number requested by the servers, the data transferred from the energy management system.

The method further includes transferring, when data for the servers to request to the energy management system is changed, a service number deleted from previously transferred service numbers and a new added service number from the server to the energy management system.

The method further includes determining, when the service number for requesting transfer of the specific data is received from the server, whether or not the server access is allowable according to a predetermined security condition.

The security condition includes at least one of an IP address of the server having transferred the service number and the number of servers allowed to be registered.

In accordance with another embodiment, a power system for transferring data includes a plurality of servers, and an energy management system operative to transfer the data requested by the servers to the servers, respectively, wherein the energy management system assigns different service numbers to types of all data transferrable to the plurality of the servers, and each of the servers transfers, to the energy management system, a service number corresponding to data to be requested, wherein, when the service numbers are received, the energy management system registers services requested by the plurality of servers, and transfers the data corresponding to the service numbers in a broadcast manner, wherein the service numbers corresponding to the data transferred in the broadcast manner are inserted into the transferred data.

When the energy management system receives, from a specific server, a service number for requesting specific data, the energy management system determines whether or not to register the requested service number according to a predetermined security condition, wherein the security condition includes at least one of an IP address of the server having transferred the service number and the number of the servers allowed to be registered.

According to embodiments of the present disclosure, since data is transferred from the EMS to multiple servers in a broadcast manner, the EMS need not establish one-to-one connection with each of the servers to transfer data. Thereby, the transfer processing time for the data may be greatly reduced.

According to embodiments of the present disclosure, registration or deletion of a service is performed according to data for which a server makes a request to the EMS, and accordingly addition of a new server or deletion of a previously registered server may be easily performed without modification of the code.

According to embodiments of the present disclosure, only data corresponding to a service number registered by a server is transferred to the server. Thereby, the server may quickly acquire desired data as the process of extracting the desired data from among multiple data is skipped.

According to embodiments of the present disclosure, the number of registered servers is limited, or service registration is allowed only for defined IP addresses. Thereby, data is prevented from being leaked through abnormal access from the outside.

DETAILED DESCRIPTION

Advantages and features of the present disclosure and methods to achieve them will become apparent from the descriptions of embodiments herein below with reference to the accompanying drawings. However, the present disclosure is not limited to embodiments disclosed herein but may be implemented in various different forms. The embodiments are provided for making the disclosure of the present disclosure thorough and for fully conveying the scope of the present disclosure to those skilled in the art. It is to be noted that the scope of the present disclosure is defined only by the claims. Like reference numerals denote like elements throughout the descriptions. Like reference numerals denote like elements throughout the descriptions.

In describing embodiments of the present disclosure disclosed in this specification, relevant well-known functions and constituents may not be described in detail if it is determined that such description can unnecessarily obscure the subject matter of the present disclosure. Terms which will be used below are defined in consideration of the functions of the corresponding elements in embodiments of the present disclosure. The definitions of the terms may vary depending on intention of a user or operator, a precedent case, or the like. Therefore, the terms should be defined based on the entire specification.

It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-useable or computer-readable memory that can direct a computer or other programmable data processing apparatuses to function in a particular manner.

Thereby, the instructions stored in the computer-useable or computer-readable memory may produce an article of manufacture including instructions which implement the function specified in the flowchart and/or block diagram block or blocks.

The computer program instructions may also be loaded onto a computer or other programmable data processing apparatuses.

Thereby, a series of operational steps may be performed on the computer or other programmable apparatuses to produce a computer implemented process.

The instructions which execute on the computer or other programmable apparatuses may provide processes for implementing the functions specified in the flowchart and/or block diagram block or blocks.

In addition, each block or step in the flowchart or block diagrams may represent a module, segment, or portion of code, which comprises one or more executable instructions for implementing the specified logical function(s). It should also be noted that, in some alternative implementations, the functions noted in the blocks or steps may occur out of the order noted in the figures. For example, two blocks or steps shown in succession may, in fact, be executed substantially concurrently, or the blocks or steps may sometimes be executed in the reverse order, depending upon the functionality involved.

Figure 2:
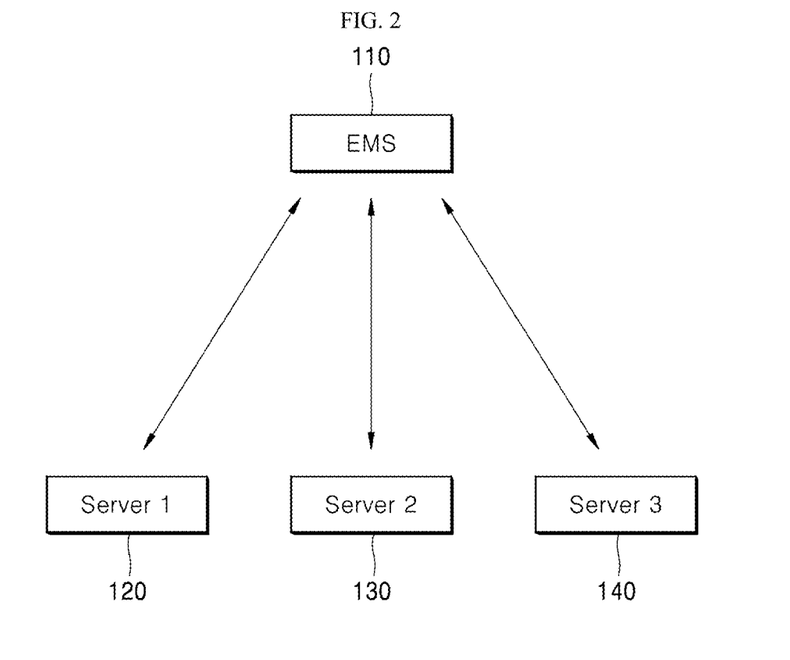
FIG. 2 is a schematic block diagram illustrating a power system according to some embodiments of the present disclosure.

FIG. 2 is a schematic block diagram illustrating a power system according to some embodiments of the present disclosure.

Referring to FIG. 2, a power system includes an EMS 110, server 1 120, server 2 130 and server 3 140

The EMS 110, which is an energy management system, performs operations such as production, transfer, distribution and management of power.

Server 1 120, server 2 130 and server 3 140 are connected to the EMS 110. Server 1 120, server 2 130 and server 3 140 receive data transferred from the EMS 110, and control or manage internal constituents using the received data.

Herein, while it is illustrated in the figure that 3 servers are configured, this is simply illustrative. The number of servers may increase or decrease.

The EMS 110, server 1 120, server 2 130 and server 3 140 are configured with different languages, different operating systems and different communication protocols, and thus there are difficulties in exchanging data therebetween.

To address this issue, the EMS 110, server 1 120, server 2 130 and server 3 140 exchange the data according to a communication protocol called Inter-Control Center Protocol (ICCP).

The ICCP designates Manufacturing Message Specification (MMS), which is a standard communication protocol for automation, as a sub-protocol of the application layer to support smooth communication between different kinds of control centers.

However, as each system is configured with a different language, operating system and communication protocol, there are difficulties in exchanging data among the systems.

To address this issue, the US Electric Power Research Institute has announced a new communication protocol called Inter-Control Center Protocol (ICCP) to manage communications between power control centers. The ICCP designates Manufacturing Message Specification (MMS), which is a standard communication protocol for automation, as a sub-protocol of the application layer to support smooth communication between different kinds of control centers.

ICCP data exchanged between the EMS 110 and server 1 120, server 2 130 and server 3 140 may be broadly divided into analog data and digital data. The analog data may include power generation amount data (of a generator level, substation level, area level, and the like), result data about computation of EMS-SCADA programs, EMS-power application result data, and logic status data (including a manual value, flag setting, tag setting, prohibition of scan, and the like) of a point changed by the EMS. The digital data may include physical status data (On/Off) about apparatuses and system status data (Active/Backup of the servers of the EMS).

The EMS 110 is connected to server 1 120, server 2 130 and server 3 140. Thereby, the EMS 110 transfers internal data to at least one of server 1 120, server 2 130 and server 3 140 according to requests from server 1 120, server 2 130 and server 3 140.

In this case, the EMS 110 transfers the data in a broadcast manner rather than the conventional manner of data transfer which is based on one-to-one connection. To this end, the EMS 110 includes a communication module (not shown) operative to transmit the data to multiple servers present in the same network in the broadcast manner.

To this end, data to be transferred in the broadcast manner needs to be selected from among multiple data and announced.

Accordingly, the EMS 110 receives service number information for the data desired by server 1 120, server 2 130 and server 3 140 from server 1 120, server 2 130 and server 3 140, and registers the same therein.

That is, all data which the EMS 110 can exchange with server 1 120, server 2 130 and server 3 140 are assigned different service numbers.

Thereby, when each of server 1 120, server 2 130 and server 3 140 makes a request for data to the EMS 110, each of server 1 120, server 2 130 and server 3 140 transmits a service number corresponding to the data to be requested to the EMS 110.

If there are service numbers transmitted from server 1 120, server 2 130 and server 3 140, the EMS 110 extracts data corresponding to the service numbers, inserts the service numbers into the extracted data, and then transfers the data comprising the service numbers in a broadcast manner.

The service numbers may be assigned as shown in Table 1 below.

TABLE 1

| Service number | Type of data |
| --- | --- |
| 1 | Power generation amount data (of a generator level, substation level, area level, and the like) |
| 2 | Result data about computation of EMS-SCADA programs |
| 3 | EMS-power application result data |
| 4 | Logic status data (including a manual value, flag setting, tag setting, prohibition of scan, and the like) of a point changed by the EMS |
| 5 | Physical status data (On/Off) about apparatuses |
| 6 | System status data (Active/Backup of the servers of the EMS) |

Referring to Table 1, in the analog data, the power generation amount data (of a generator level, substation level, area level, and the like) may be assigned a service number '1', and the result data about computation of EMS-SCADA programs may be assigned a service number '2'. The EMS-power application result data may be assigned a service number '3', and the logic status data (including a manual value, flag setting, tag setting, prohibition of scan, and the like) of a point changed by the EMS may be assigned a service number '4'. In the digital data, the physical status data (On/Off) about apparatuses included may be assigned a service number '5', and the system status data (Active/Backup of the servers of the EMS) may be assigned a service number '6'.

Thereby, each server transfers a desired service number to the EMS 110 and registers the same in the EMS 110, and the EMS 110 transfers data corresponding to the service numbers transmitted from the servers, in a broadcast manner.

As shown in Table 1, different service numbers may be assigned to respective types of data. Alternatively, a plurality of types of data may be grouped into one group and assigned one service number.

That is, if only service numbers are assigned as described above, a server desiring a plurality of types of data needs to transmit service numbers corresponding to the respective data types to the EMS 110.

Accordingly, in some embodiments, a plurality of types of data may be grouped into one service number.

The grouping may be performed as shown in Table 2.

TABLE 2

| Service group | Service number | Type of data |
| --- | --- | --- |
| 7 | 1 | power generation amount data (of a generator level, substation level, area level, and the like) |
| | 2 | result data about computation of EMS-SCADA programs |

TABLE 2-continued

| Service group | Service number | Type of data |
| --- | --- | --- |
| | 3 | EMS-power application result data |
| | 4 | logic status data (including a manual value, flag setting, tag setting, prohibition of scan, and the like) of a point changed by the EMS |
| 8 | 5 | physical status data (On/Off) about apparatuses |
| | 6 | system status data (Active/Backup of the servers of the EMS) |

As shown in Table 2, service numbers 1, 2, 3 and 4 may be grouped into service group '7', and service numbers 5 and 6 may be grouped into a service group indicated by service group '8'.

Thereby, server 1 120, server 2 130 and server 3 140 may transmit a service group number corresponding to a service group of desired data to the EMS 110.

Meanwhile, the EMS 110 may receive a service number from a new server (e.g., server 4) other than the existing connected servers.

This operation corresponds to a step of registering a new server. The EMS 110 determines whether or not to register a service number requested by the new server according to the information about the new server under a security condition.

Herein, the security condition may include the number of registered servers and server IP addresses.

That is, the EMS 110 limits the number of registered servers for reasons such as data transfer and communication connection.

For example, the number of servers may be limited to 3.

In this case, the EMS 110 determines the number of servers previously registered before the new server makes a request for registration of a service number to the EMS 110. If the number of previously registered servers is less than the limit, the EMS 110 allows registration of the new server. If the number of previously registered servers is equal to the limit, the EMS, the EMS 110 restricts registration of the new server.

In addition, the EMS 110 stores approved server address information for allowing normal access.

Thereby, the EMS 110 checks the IP address information about the new server requesting registration of a service number, and checks whether the checked IP address is a pre-stored IP address.

If the checked IP address is a pre-stored IP address, the EMS 110 allows registration of the new server. Otherwise, the EMS 110 restricts registration of the new server.

That is, the ICCP protocol includes not only the function of exchange of information about a power grid but also the function of power device control. Since the ICCP protocol operates based on the TCP/IP protocol, various cyber attacks against the ICCP are potentially possible. A power supply center, which is an important national infrastructure using this protocol, needs to be provided with a robust system of reaction against cyber terror. Currently, a communication section in which the ICCP protocol is used is typically separated from an external network to secure stability. However, if enhancement of security through separation from the network does not involve systematic management thereof, the communication section may include a potential risk of being persistently exposed to human vulnerability or physical vulnerability through a new type of mobile devices. Accordingly, due to likelihood of a security accident, there is a need for application of higher security technologies to control centers separated from external networks.

Accordingly, in some embodiments, registration of a new server is restricted as described above to raise the security level of the protocol.

According to embodiments of the present disclosure, since data is transferred from the EMS to multiple servers in a broadcast manner, the EMS need not establish one-to-one connection with each of the servers to transfer data. Thereby, the data transfer processing time may be greatly reduced.

According to embodiments of the present disclosure, since registration or deletion of a service is performed according to data for which a server makes a request to the EMS, addition of a new server or deletion of a previously registered server may be easily performed without modification of the code.

According to embodiments of the present disclosure, only data corresponding to a service number registered by a server is transferred to the server. Thereby, the server may quickly acquire desired data as the process of extracting the desired data from among multiple data is skipped.

According to embodiments of the present disclosure, the number of registered servers is limited, or service registration is allowed only for defined IP addresses. Thereby, data is prevented from being leaked through abnormal access from the outside.

FIGS. 3 to 11 illustrate steps of a method for transferring data in an EMS according to some embodiments of the present disclosure.

Figure 3:
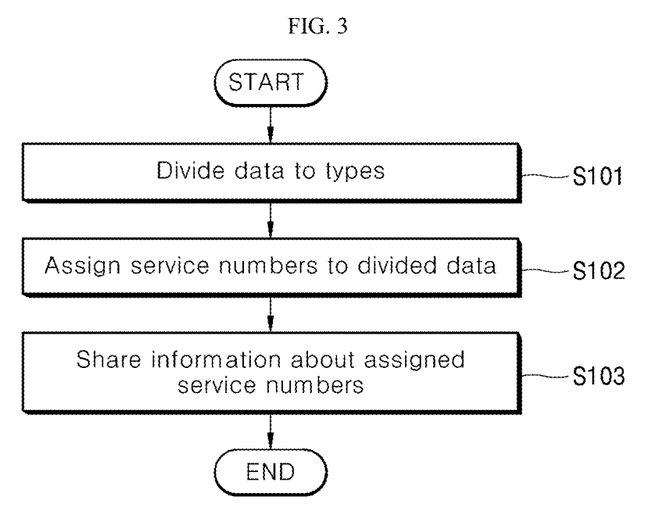
FIG. 3 is a flowchart illustrating steps of a method for distinguishing among data according to some embodiments of the present disclosure.

FIG. 3 is a flowchart illustrating steps of a method for distinguishing among data according to some embodiments of the present disclosure.

Referring to FIG. 3, the EMS 110 divides all data which may be generated therein according to the respective types of the data (step 101).

That is, all data are divided into analog data and digital data. The analog data includes power generation amount data (of a generator level, substation level, area level, and the like), result data about computation of EMS-SCADA programs, EMS-power application result data and logic status data (including a manual value, flag setting, tag setting, prohibition of scan, and the like) of a point changed by the EMS. The digital data includes physical status data (On/Off) about apparatuses and system status data (Active/Backup of the servers of the EMS).

Thereby, the EMS 110 divides all the data according to the types of data.

Once all the data is divided according to the types thereof, the EMS 110 may assign a different service number to each divided data (step 102).

That is, in the analog data, the power generation amount data (of a generator level, substation level, area level, and the like) may be assigned a service number '1', and the result data about computation of EMS-SCADA programs may be assigned a service number '2'. The EMS-power application result data may be assigned a service number '3', and the logic status data (including a manual value, flag setting, tag setting, prohibition of scan, and the like) of a point changed by the EMS may be assigned a service number '4'. In the digital data, the physical status data (On/Off) about apparatuses may be assigned a service number '5', and the system status data (Active/Backup of the servers of the EMS) may be assigned a service number '6'.

In addition, a plurality of data assigned respective service numbers may be grouped into one service group.

That is, service numbers 1, 2, 3 and 4 may be grouped into a service group indicated by '7', and service numbers 5 and 6 may be grouped into a service group indicated by '8'.

Once the service numbers and service groups are designated, the EMS 110 shares the information about the designated service numbers and service groups with server 1 120, server 2 130 and server 3 140 (step 103).

Figure 4:
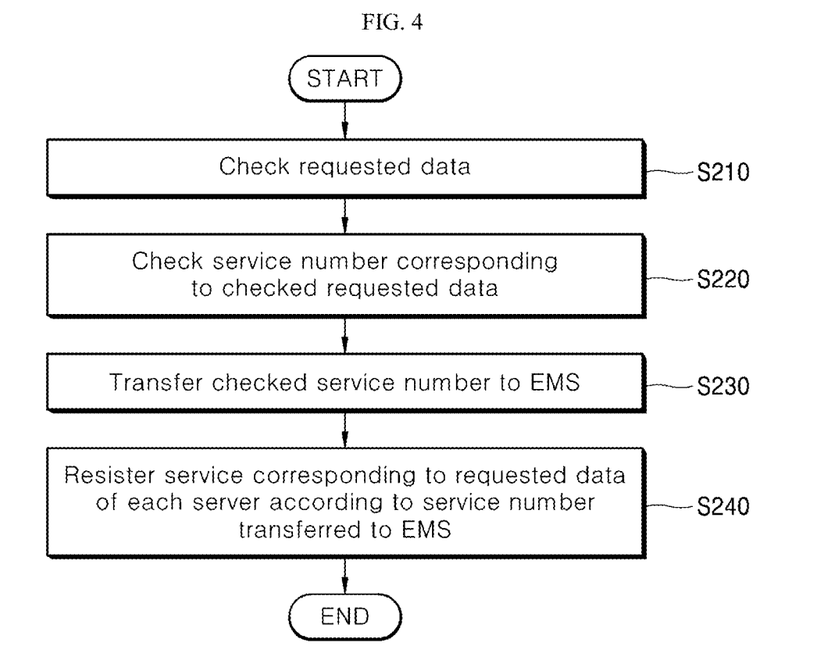
FIGS. 4 and 5 are flowcharts illustrating steps of a method for registering a service according to some embodiments of the present disclosure.
Figure 5:
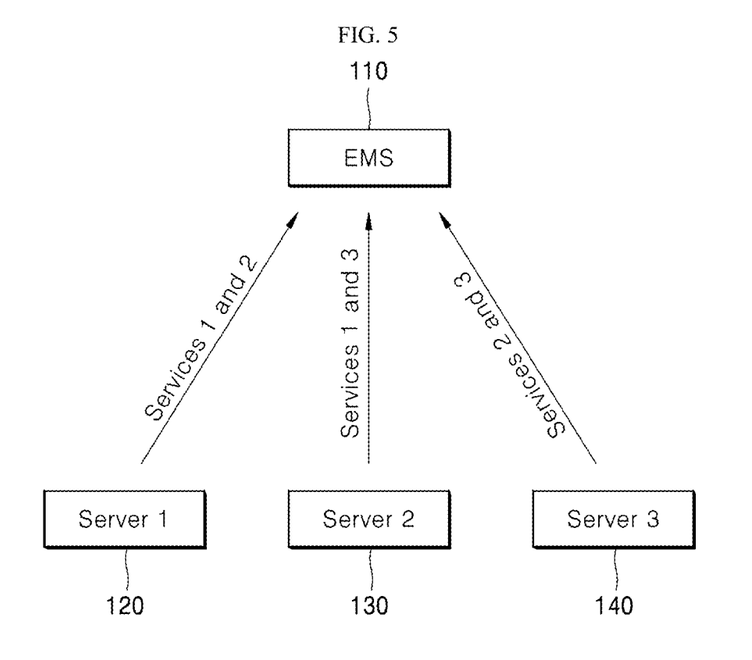

FIGS. 4 and 5 are flowcharts illustrating steps of a method for registering a service according to some embodiments of the present disclosure.

Referring to FIGS. 4 and 5, each of server 1 120, server 2 130 and server 3 140 checks whether there is data they need, namely data for which the servers need to make a request to the EMS 110 (step 210).

If there is data to be requested, server 1 120, server 2 130 and server 3 140 check a service number or service group number corresponding to the checked data (step 220).

Subsequently, server 1 120, server 2 130 and server 3 140 transmit the checked service number or service group number to the EMS 110 (step 230).

Once the service number or service group number is transmitted, the transmitted service number or service group number is stored and registered in each of the EMS 110, server 1 120, server 2 130 and server 3 140 (step 240).

Figure 6:
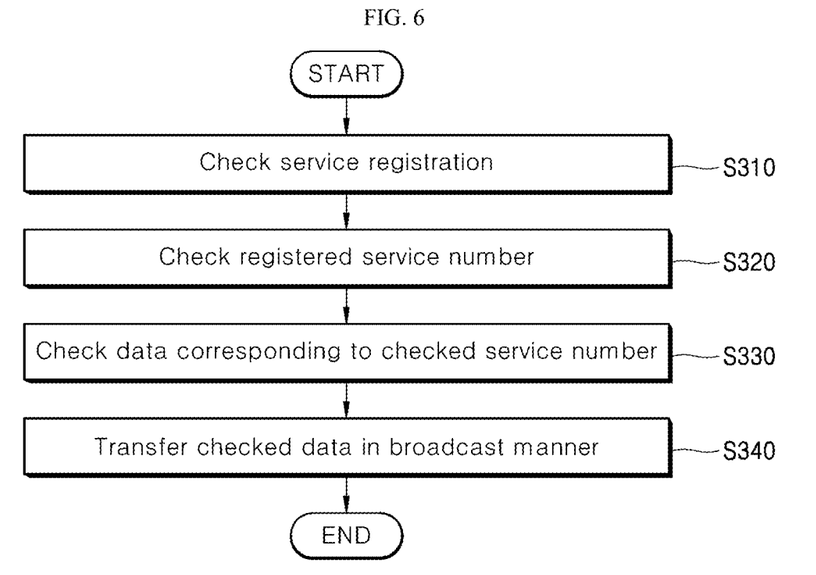
FIGS. 6 and 7 are flowcharts illustrating steps of a method for transferring data according to some embodiments of the present disclosure.
Figure 7:
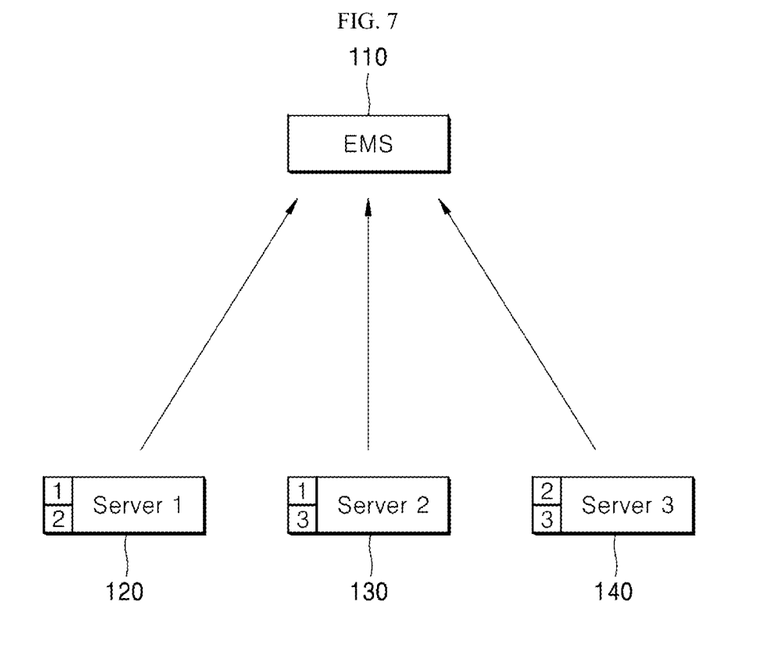

FIGS. 6 and 7 are flowcharts illustrating steps of a method for transferring data according to some embodiments of the present disclosure.

Referring to FIGS. 6 and 7, the EMS 110 perform service registration based on the service numbers or service group numbers transmitted from server 1 120, server 2 130 and server 3 140, and checks a preregistered service (step 310).

Subsequently, once the preregistered service is checked, the EMS 110 checks the service number or service group number of the registered service (step 320).

Once the service number or service group number is checked, the EMS 110 extracts data corresponding to the service number or service group number (step 330).

Subsequently, the EMS 110 inserts the service number or service group number of the corresponding data into the extracted data, and then transfers the data comprising the service number or service group number in a broadcast manner (step 340).

Figure 8:
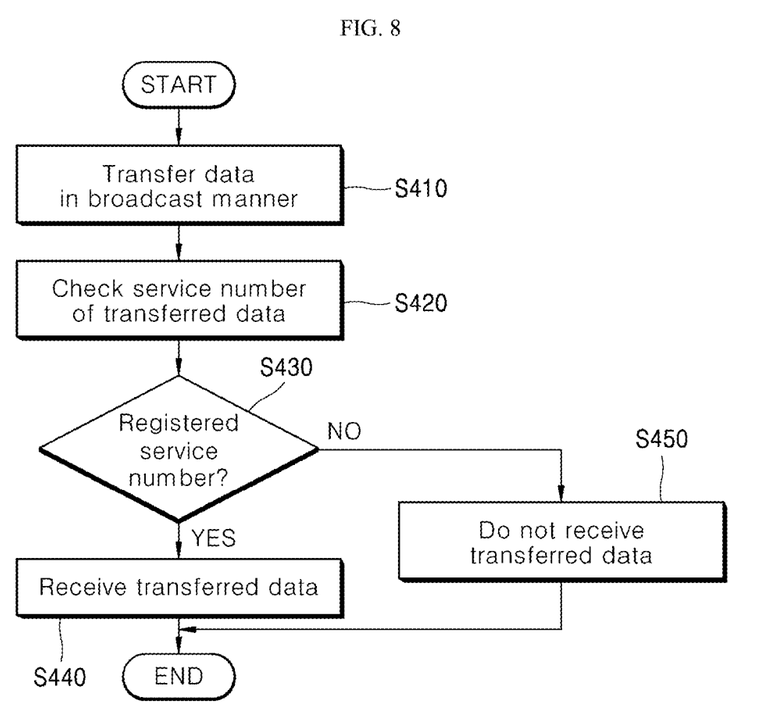
FIGS. 8 and 9 are flowcharts illustrating steps of a method for receiving data according to some embodiments of the present disclosure.
Figure 9:
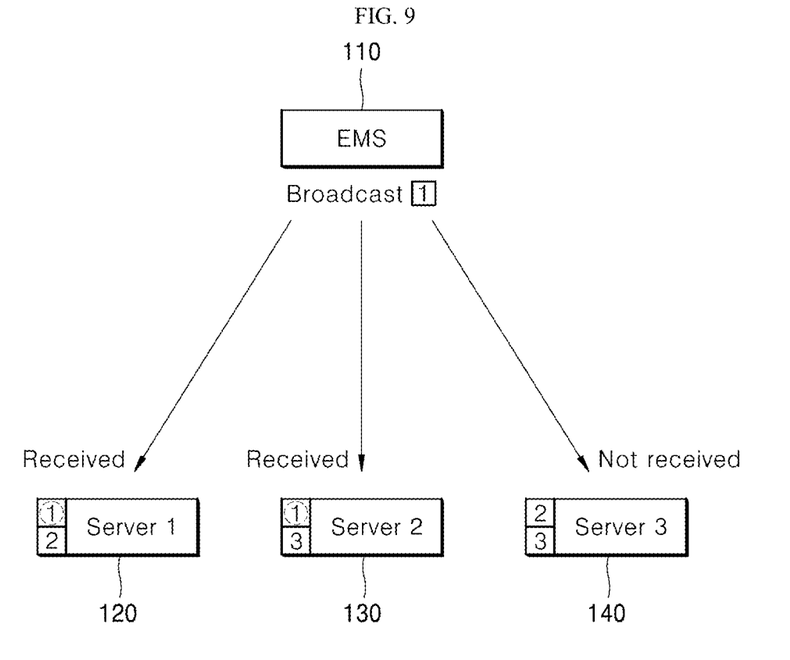

FIGS. 8 and 9 are flowcharts illustrating steps of a method for receiving data according to some embodiments of the present disclosure.

Referring to FIGS. 8 and 9, the EMS 110 transfers data in a broadcast manner (step 410).

Once the data is transferred, server 1 120, server 2 130 and server 3 140 checks the service number or service group number of corresponding data comprised in the transferred data (step 420).

Subsequently, server 1 120, server 2 130 and server 3 140 determine whether the checked service number or service group number is a service number or service group number they requested (step 430).

If the data corresponds to the service number or service group number which server 1 120, server 2 130 and server 3 140 have requested, server 1 120, server 2 130 and server 3 140 receive the data transferred from the EMS 110 (step 440).

If the data does not correspond to the service number or service group number which server 1 120, server 2 130 and server 3 140 have requested, server 1 120, server 2 130 and server 3 140 do not receive the data transferred from the EMS 110 (step 450).

Figure 10:
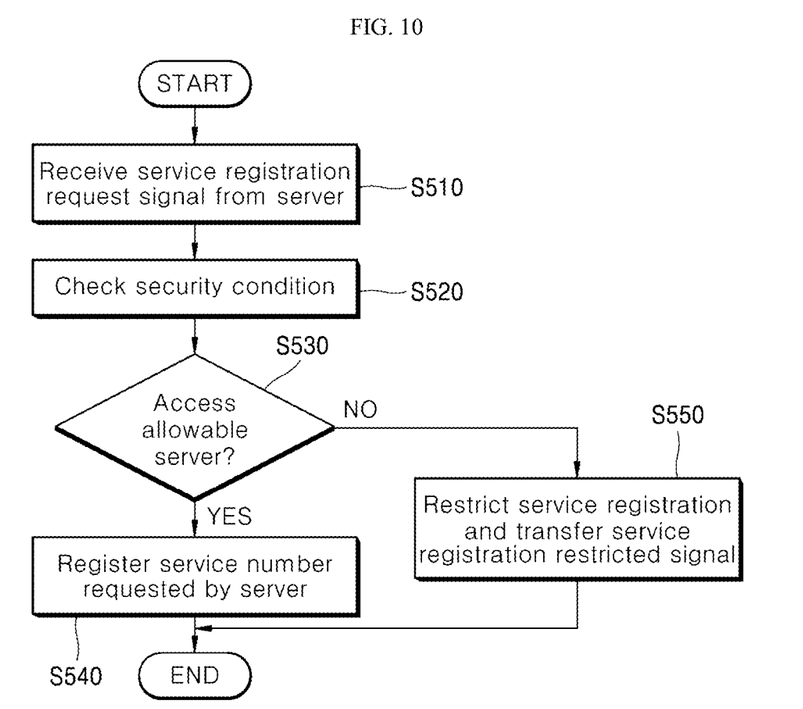
FIG. 10 is a flowchart illustrating steps of a method for restricting registration of a server according to some embodiments of the present disclosure.

FIG. 10 is a flowchart illustrating steps of a method for restricting registration of a server according to some embodiments of the present disclosure.

Referring to FIG. 10, the EMS 110 receives a service registration request signal from a specific server (step 510).

Upon receiving the service registration request signal, the EMS 110 checks a security condition based on the information about the server having requested service registration (step 520).

That is, the EMS 110 checks the security condition by checking whether the number of previously registered servers is less than the limit and whether the IP address of the server having requested service registration is a pre-stored IP address.

Then, the EMS 110 determines whether access of the server having requested service registration is allowable as a result of checking of the security condition (step 530).

Subsequently, if access of the server is allowable, the EMS 110 stores and registers the service number requested by the server (step 540).

If access of the server is not allowable, the EMS 110 does not store the service number requested by the server. Thereby, the EMS 110 transmits a signal announcing that access to the server is restricted (step 550).

Figure 11:
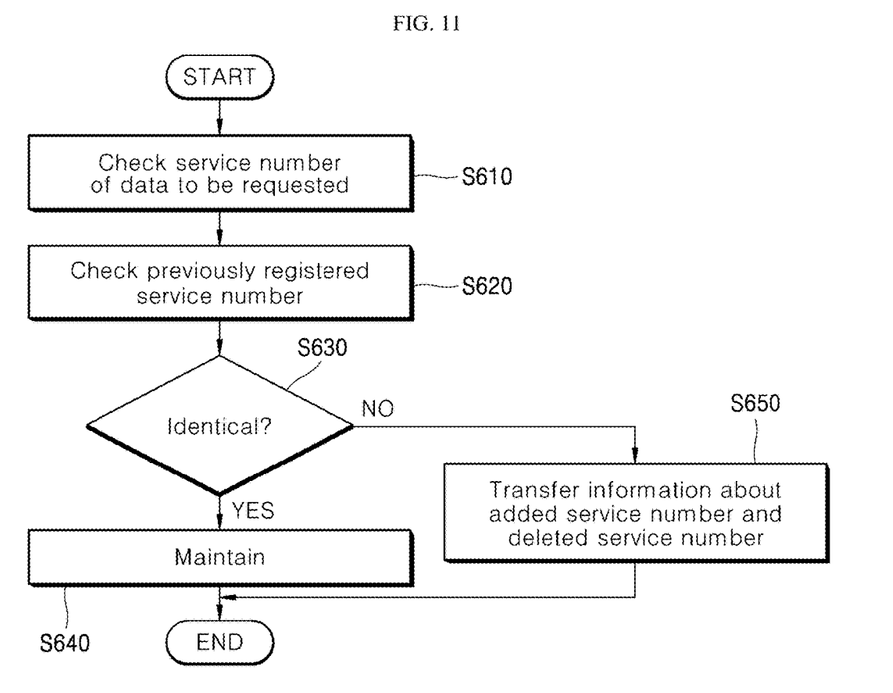
FIG. 11 is a flowchart illustrating steps of a method for changing a service according to some embodiments of the present disclosure.

FIG. 11 is a flowchart illustrating steps of a method for changing a service according to some embodiments of the present disclosure.

Referring to FIG. 11, each of server 1 120, server 2 130 and server 3 140 checks the service number or service group number of data which they intend to request (step 610).

Subsequently, each of server 1 120, server 2 130 and server 3 140 checks the service number or service group number of data for which they have previously made a request to the EMS 110 (step 620).

Then, each of server 1 120, server 2 130 and server 3 140 determines whether the previously requested service number or service group number is identical to the currently requested service number or service group number (step 630).

If the previously requested service number or service group number is identical to the currently requested service number or service group number, each of server 1 120, server 2 130 and server 3 140 maintains the previously registered service (step 640).

If the previously requested service number or service group number is different from the currently requested service number or service group number, each of server 1 120, server 2 130 and server 3 140 transmits information corresponding to an added a service number or service group number and a deleted service number or service group number to the EMS 110 (step 650).

Then, the EMS 110 modifies the previously transferred data using the information transmitted from each of server 1 120, server 2 130 and server 3 140.

That is, the EMS 110 deletes content corresponding to the deleted service number or service group number from the previously transferred data, and adds content corresponding to the added service number or service group number to the previously transferred data.

According to embodiments of the present disclosure, data is transferred from the EMS to multiple servers in a broadcast manner, and accordingly the EMS need not establish one-to-one connection with each of the servers to transfer data. Thereby, the data transfer processing time may be greatly reduced.

According to embodiments of the present disclosure, since registration or deletion of a service is performed according to data for which a server makes a request to the EMS, addition of a new server or deletion of a previously registered server may be easily performed without modification of the code.

According to embodiments of the present disclosure, only data corresponding to a service number registered by a server is transferred to the server. Thereby, the server may quickly acquire desired data as the process of extracting the desired data from among multiple data is skipped.

According to embodiments of the present disclosure, the number of registered servers is limited, or service registration is allowed only for defined IP addresses. Thereby, data is prevented from being leaked through abnormal access from the outside.

According to embodiments of the present disclosure, since data is transferred from the EMS to multiple servers in a broadcast manner, the EMS need not establish one-to-one connection with each of the servers to transfer data. Thereby, the transfer processing time for the data may be greatly reduced.

According to embodiments of the present disclosure, since registration or deletion of a service is performed according to data for which a server makes a request to the EMS, addition of a new server or deletion of a previously registered server may be easily performed without modification of the code.

According to embodiments of the present disclosure, only data corresponding to a service number registered by a server is transferred to the server. Thereby, the server may quickly acquire desired data as the process of extracting the desired data from among multiple data is skipped.

Features, structures and effects described in the embodiments are included in at least one embodiment, but not limited to only one embodiment. Further, features, structures and effects of different environments may be employed in combination or variation by those skilled in the art. Accordingly, details related to such combination and variation should be understood as falling within the scope of the embodiments.

While embodiments of the present disclosure have been described above, it should be understood that they have been presented by way of example only, and not as a limitation. It will be apparent to persons skilled in the art that various modifications and variations can be made to the embodiments without departing from the spirit and scope of the embodiments as defined by the accompanying claims. Thus, it is intended that the embodiments include modifications and variations that are within the scope of the appended claims and their equivalents. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for transferring different types of data in a power system, the method comprising:
assigning, by an energy management system including a processor, a different service number to each type of data which the energy management system can exchange with a server, wherein the energy management system includes a communication module;
transferring a service number corresponding to data from the server to the energy management system;
transferring the data corresponding to the transferred service number from the energy management system by broadcasting the data; and
receiving, by the server, the data transferred from the energy management system by broadcasting the data,
wherein the transferring of the data corresponding to the transferred service number comprises:
adding a service number of the data to the data and transferring the data;
wherein the receiving of the data comprises:
the server checking the service number of the transferred data;
determining whether the checked service number is a service number requested by the server;
receiving, when the checked service number is the service number requested by the server, the data transferred from the energy management system; and
not receiving, when the checked service number is not the service number requested by the servers, the data transferred from the energy management system, and
wherein the method further comprises:
transferring, by the server, when the data for the server to request from the energy management system is changed, information regarding a service number deleted from previously transferred service numbers and a newly added service number to the energy management system, and
modifying, by the energy management system, previously transferred data using the received information.

2. The method according to claim 1, wherein the data comprises at least one of:
power generation amount data comprising at least one of: a generator level, a substation level or an area level;
result data comprising computation data of EMS-SCADA programs;
EMS-power application result data;
logic status data of a point changed by the energy management system, the logic status data comprising at least one of: a manual value, flag setting, tag setting, or prohibition of scan;
physical status data about apparatuses; or
system status data.

3. The method according to claim 1, wherein assigning the different service number comprises:
assigning a service group number to each type of data, and the method further comprises:
transferring, when each type of data is assigned the different service number and the service group number, information about the assigned service number or service group number to the server.

4. The method according to claim 1, further comprising:
determining, when the service number for requesting transfer of the data is received from the server, whether server access is allowed according to a predetermined security condition,
wherein the predetermined security condition comprises at least one of: an IP address of the server having transferred the service number or a number of servers allowed to be registered.

5. A power system for transferring data, comprising:
a plurality of servers configured to transfer, to an energy management system, service numbers corresponding to data for the servers to request; and
the energy management system configured to transfer the data requested by the servers to the servers, wherein the energy management system includes a processor, wherein the energy management system includes a communication module,
wherein the energy management system is further configured to assign different service numbers to types of all data transferrable to the plurality of the servers,
wherein, when the service numbers are received from the plurality of servers, the energy management system is further configured to register services requested by the plurality of servers, select the data to be transferred, and transfer the data corresponding to the service numbers by broadcasting the data,
wherein the data transferred from the energy management system contains service numbers corresponding to the data,
wherein each of the servers receives the transferred data and selectively receives data corresponding to the service number requested by each of the servers, using the service numbers contained in the received data,
wherein the servers are configured to transfer, when the data for the servers to request from the energy management system is changed, information regarding a service number deleted from previously transferred service numbers and a newly added service number to the energy management system, and
wherein the energy management system is configured to modify previously transferred data using the received information.

6. The power system according to claim 5, wherein, when the energy management system is further configured to receive, from a server, a service number for requesting data, determine whether access of the server requesting transfer of the data is allowed according to a predetermined security condition, and selectively register the service number for requesting data according to the determination,
wherein the predetermined security condition comprises at least one of: an IP address of the server having transferred the service number or a number of the servers allowed to be registered.

* * * * *